Figure 1:
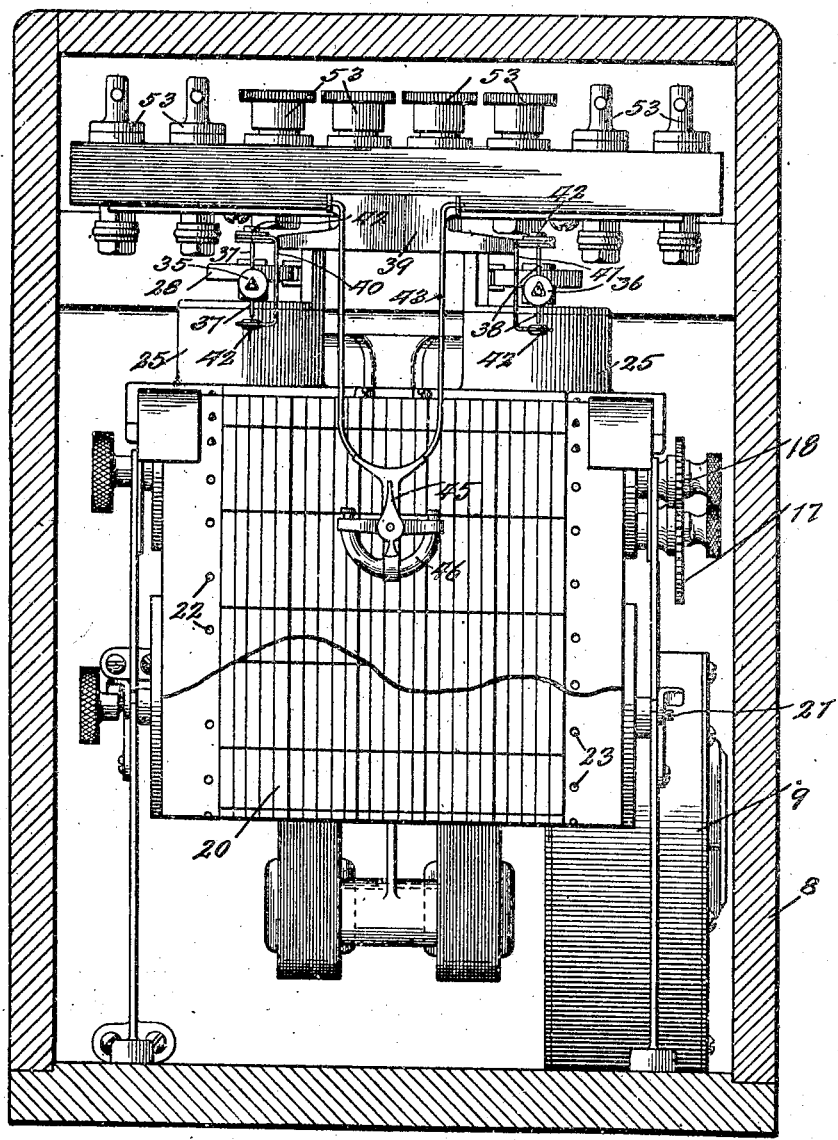

R. C. LANPHIER.
GRAPHIC RECORDING INSTRUMENT.
APPLICATION FILED NOV. 9, 1910.

992,010.

Patented May 9, 1911.
4 SHEETS—SHEET 1.

R. C. LANPHIER.
GRAPHIC RECORDING INSTRUMENT.
APPLICATION FILED NOV. 9, 1910.

992,010.

Patented May 9, 1911.

R. C. LANPHIER.
GRAPHIC RECORDING INSTRUMENT.
APPLICATION FILED NOV. 9, 1910.

992,010.

Patented May 9, 1911.
4 SHEETS—SHEET 3.

R. C. LANPHIER.
GRAPHIC RECORDING INSTRUMENT.
APPLICATION FILED NOV. 9, 1910.
992,010.
Patented May 9, 1911.
4 SHEETS—SHEET 4.
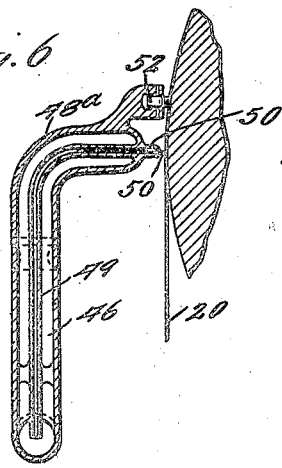
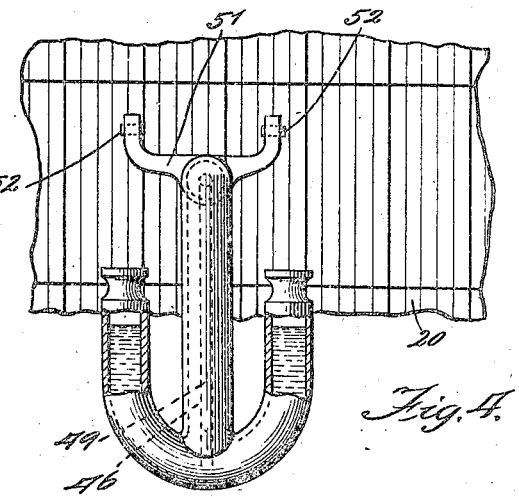
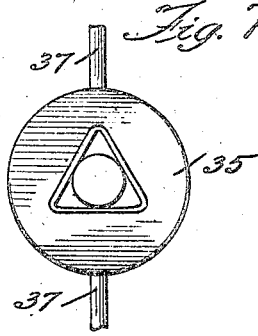
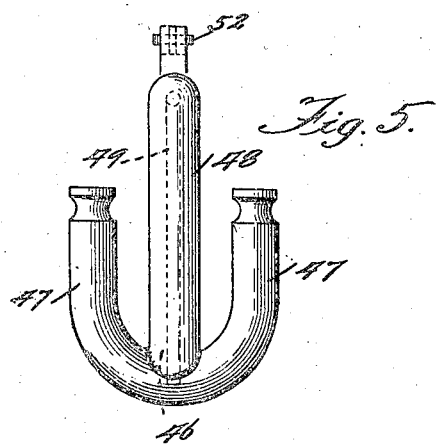

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

GRAPHIC RECORDING INSTRUMENT.

992,010.                      Specification of Letters Patent.          Patented May 9, 1911.

Application filed November 9, 1910. Serial No. 591,458.

*To all whom it may concern:*

Be it known that I, ROBERT C. LANPHIER, a citizen of the United States, residing at Springfield, in the county of Sangamon and State of Illinois, have invented certain new and useful Improvements in Graphic Recording Instruments, of which the following is a specification, reference being had to the accompanying drawings.

My invention relates to graphic recording instruments in which variations in pressure or quantity of force are recorded by means of a recording pen or pencil which traces a line on a paper roll or chart driven by clockwork in such a way that the line traced upon the chart will show the variations in the pressure or quantity of force which have taken place and the times at which they have taken place.

More particularly, my invention relates to a graphic recording instrument for recording the variations in electric circuits, such as those of quantity and pressure, and its object is to produce a new and improved graphic recording instrument especially adapted for measuring various variations in electric circuits and recording the same.

More particularly still, my invention relates to a graphic recording instrument employing two motor elements which may be operated together or independently, each upon its own shaft, the said shafts each carrying an arm connected with each other by suitable link-work from which the recording pen is suspended, which permits a combination of the two motor or actuating elements in such a way that, without change in the arrangement or construction of the motor elements, they may be used upon various systems, such as polyphase systems, single phase alternating systems, or two-wire or three-wire direct current systems.

More particularly still, it relates to a meter of the above type in which the two motor elements being arranged upon substantially the same horizontal plane with their shafts provided with substantially horizontally extending arms connected by a link-work from which the pen is suspended, a very rigid construction for the indicating arms and link-work is provided and an accurate suspension of the pen is secured.

Another object of my invention is to provide a clock or watch dial, with, of course, suitable hands, connected with the ordinary driving clockwork mechanism used in such machines for driving the paper roll in order to permit the ready checking of the accuracy of the clock drive, which, without such clockwork arranged to record time as well as to drive the recording roll, necessitated observation and comparison of the paper chart in order to determine whether the driving clockwork mechanism was running correctly.

Another object of my invention is to provide a new and improved pen for such graphic recording instruments. In electric recording instruments the relatively low torque of the motor element has made it difficult to guard against the friction of the pen upon the chart across which the pen passes and which itself moves under the pen. One way in which this difficulty has been overcome heretofore has been by utilizing a relay principle having an auxiliary source of power for operating the pen itself, the instrument proper acting only as a relay to operate the auxiliary power. It is one of the objects of my invention, therefore, to provide a new and improved recording pen in which, by means of a suitably disposed roller carried near the point of the pen and resting upon the surface of the paper, the pen is held out of direct contact with the hard surface of the paper, but sufficiently close thereto for the fiber of the paper to draw the ink from the point of the pen.

Other objects of my invention consist in detail improvements in graphic recording instruments of the type above described and hereinafter pointed out.

I attain these objects as illustrated in the drawings and as hereinafter described.

What I regard as new is set forth in the claims.

Figure 2:
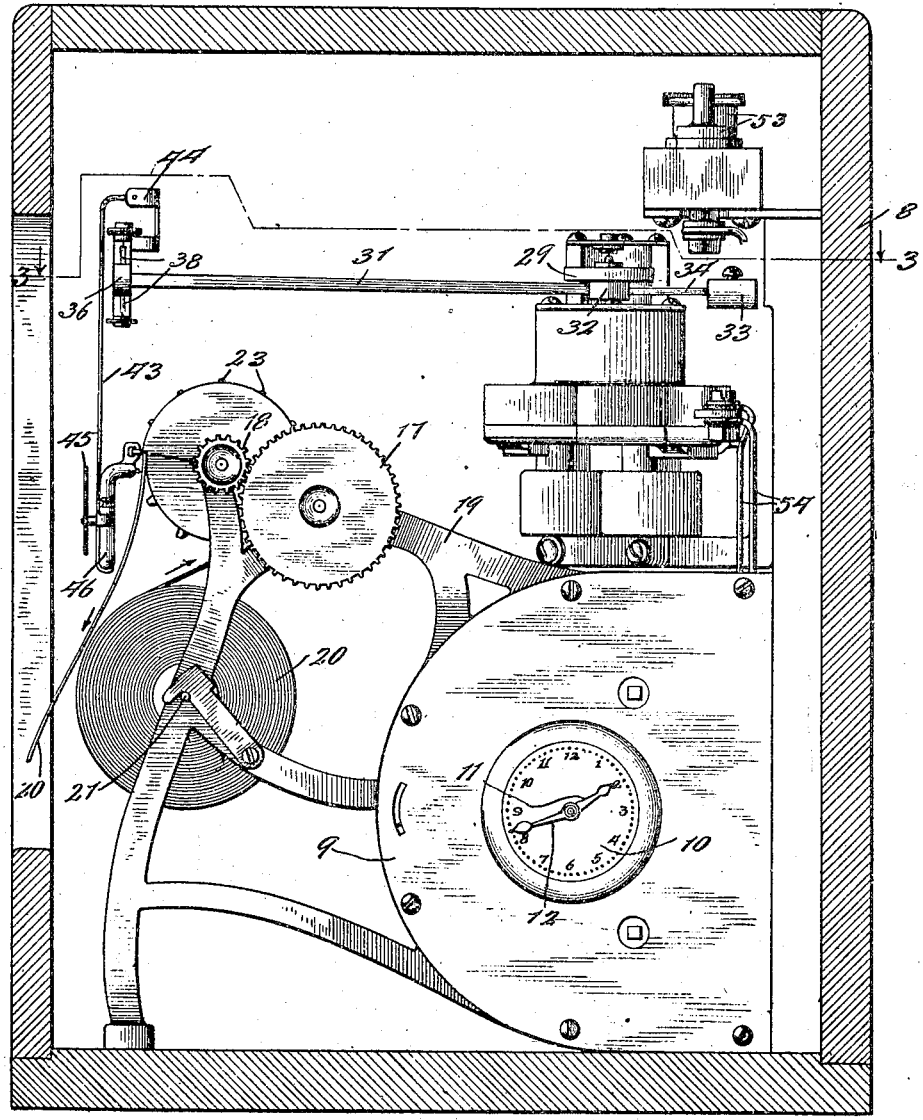
Figure 3:
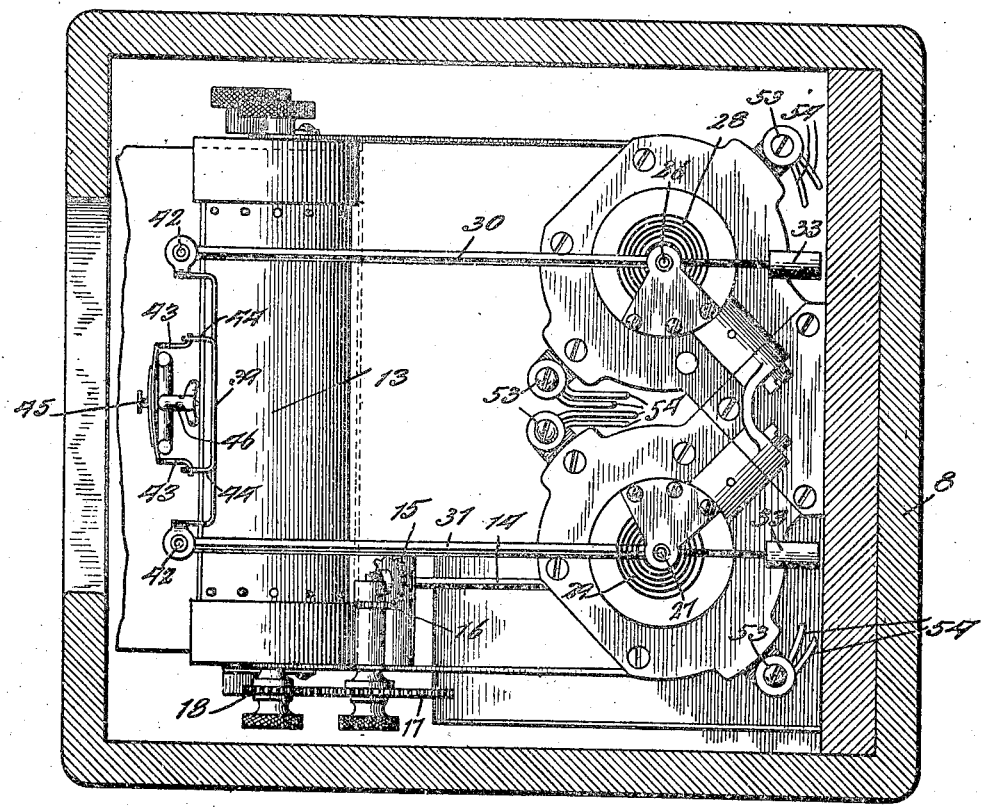

In the drawings,—Figure 1 is a front elevation with the casing in section; Fig. 2 is a side elevation with the casing in section; Fig. 3 is a top or plan view taken in section on line 3—3 of Fig. 3; Fig. 4 is a very much enlarged detail, being a view of the recording pen and a portion of the roller upon which it acts; Fig 5 is a modification, being a view of the pen, showing a single roller instead of two; Fig. 6 is an enlarged detail, being a vertical section of the pen shown in Fig. 5; Fig. 7 is an enlarged detail, being a view of the end of one of the arms connected with the motor shaft and showing the method of connection of the hanger therewith.

Referring to the drawings,—8 indicates the main casing, in which is suitably mounted a clock mechanism 9 which may be of any well-known character and description and operates in the usual manner and is therefore not shown in order not to confuse the drawings.

10 indicates a clock dial upon the outside of the clockwork casing and marked with the hours and minutes in the usual manner.

11—12 indicate, respectively, hour and minute hands, which are connected in any well-known manner with the clock mechanism 9 and which indicate, of course, the proper time of day.

13 indicates a roller, which, by means of a drive-shaft 14, driven by the clockwork, crown gears 15—16 and gears 17 and 18, is driven in the direction indicated by the arrow in Fig. 2. The roller 13 is journaled in a suitable framework, as 19.

20 indicates a roll of paper which is carried upon a suitable spindle, as 21, journaled in the framework 19. This paper is of the usual kind and is marked into longitudinal and transverse divisions which indicate, respectively, the degrees of variations of the instrument and the hours and portions of hours of travel of the paper. The paper 20 is, near each side margin, provided with a series of perforations 22 spaced equal distances apart, which are engaged by pins 23 near each end of the roller 13 spaced also equal distances apart and at the same distance apart as the perforations in the paper roll. These perforations and pins are old and well known and serve to positively carry the paper off the roll in front of the pen hereinafter described.

24—25 indicate motor elements, which are suitably secured in the frame 8 and are preferably located in the same horizontal plane. These motor elements may be of any well-known type adapted to be operated by the passage therethrough of an electric current or currents, but are preferably of the mercury motor type well known and understood in the art and operating in the well-known way. As they may be of any well-known type, it is believed that it is unnecessary to show and describe the armatures and driving fields and electric connections in detail, as the operation of each will be readily understood, without such description, by those skilled in the art. Each of these motor elements is provided with a shaft 26—27, each of which is connected with a spiral spring 28—29, against the tension of which the motor element operates in the well-known manner.

It will be readily understood from the above that the shafts do not rotate continuously, but that they oscillate back and forth under the impulse of the electric currents and against the tension of the spring in the well-known manner so that the amount of their swing at any time is dependent upon the current passing through the motor element.

30—31 indicate arms, which, as is best shown in Fig. 7, are preferably formed of thin strips of aluminum bent into a tube triangular in cross-section in order to secure lightness and the requisite stiffness. These arms 30—31 are rigidly secured to the shafts 26—27, respectively, in any suitable manner, as, for instance, by being fixed in collars 32 carried on said shafts.

33 indicate counter-weights, which are adjustably mounted upon the rods 34 also secured in the collars 32.

The arms 30—31 are so adjusted as to lie parallel to each other with their forward ends projecting out a suitable distance beyond the front of the roller 13 and beyond the surface of the paper 20 carried thereby. Of course it will be obvious that as the shafts oscillate the arms are carried with them so that their ends oscillate back and forth in corresponding arcs of circles in front of the roller 13. The arms are preferably made of considerable length—that is to say, as long as is consistent with proper rigidity and reasonable size of the structure—in order that their forward ends may trace as flat an arc as is convenient.

35—36 indicate collars, which are secured, respectively, to the forward ends of the arms 30—31.

37—38 indicate bearing spindles, which are rigidly mounted, respectively, in the collars 35—36 and extend vertically upward and downward therefrom.

39 indicates a cross-bar, which carries at each end stirrups 40—41 depending downward therefrom, and which are provided with suitable bearings, as 42, which revolubly engage the ends of the spindles 37—38, whereby, as the arms 30—31 swing from side to side, the cross-bar 39 is always parallel to the surface of the paper.

43 indicates a forked hanger, which is swingingly suspended from struck-up portions 44 of the cross-bar 39 by having the upper ends of the forks journaled in said struck-up portions 44. The hanger extends downward in front of the roller 13 and carries at its lower end a pointer 45 and recording pen 46.

The pen, as a whole, may be of any well-known and approved form, but is preferably of the form best shown in Figs. 4, 5 and 6. Referring to those figures, it will be seen that the pen 46 is made up of a U-shaped portion having two arms 47 and of an upright portion 48. The upright portion 48 opens into the bottom of the U-shaped portion, and these portions are shaped to contain ink, as is indicated in Fig. 4. The upright portion 48 contains a capillary tube 49 whose lower end extends down into the ink and whose upper end projects forward out of the upper end of the upright portion 48, which is bent inward at 48ª toward the surface of the paper. 50 indicates a marking stylus, which projects out of the free end of the capillary tube 49 and is adapted to transfer the ink drawn upward by capillary action through the tube 49 to the surface of the paper. Referring particularly to Fig. 4, 51 indicates a two-armed bracket which is carried by the upper end of the tube 48. 52 indicates anti-friction rollers, which are mounted in the ends of the forked bracket 51 and are adapted to rest upon and bear against the surface of the paper, their position with reference to the rest of the pen being so adjusted that as they bear upon the paper under the swing of the hanger they hold the point of the stylus out of direct contact with the surface of the paper but close enough to permit the fibrous surface of the paper to draw the ink from the stylus so as to trace the line upon the paper. By this means the friction between the end of the stylus and the surface of the paper is prevented, thereby permitting the instrument to operate at very low torque and therefore under very low loads.

53 indicates binding screws of suitable character, by means of which the lead wires, as 54, may be suitably connected with the motor elements, which may obviously be connected either in series with each other or upon different circuit leads, as upon polyphase or single phase alternating systems, or three-wire D. C. systems, or they may be connected in any desired way relatively to each other to suit the demands of the instrument. In any case it will be obvious that operating upon different shafts which are connected by the projecting arms and link mechanism above described, their total effect, or total effect relative to each other, will be indicated and recorded by the recording pen.

The operation of the machine will be readily understood from the above description. The roller 13 being driven by the clockwork in the casing 9, will unroll the paper 20 on the spindle 31 in the direction indicated by the arrows in Fig. 1 in front of the recording pen. Any variations in the current or currents passing through the motor elements, or through either of them if only one is used, will be, of course, traced upon the paper by the recording pen, indicating both the degree of variation at any time and the time at which such variation occurred. By means of the dial driven by the same clockwork, it will be easy at any time by comparing the said clock with the standard time to ascertain whether the mechanism is running correctly, so that the several variations are recorded as occurring at the time at which they actually did occur.

That which I claim as my invention, and desire to secure by Letters Patent, is,—

1. In combination, a pair of independently operable motor elements, each having its own shaft, an arm projecting from the shaft of each motor element, a link connection between said arms, and a recording pen carried by said link connection.

2. In combination, a pair of independently operable electric motor elements, each having its own shaft, an arm projecting from the shaft of each motor element, a link connection between said arms, and a recording pen suspended from said link connection.

3. In combination, a pair of motor elements adapted to be independently operated by electric currents conveyed thereto and having each a shaft, an arm projecting from the shaft of each motor element, a link connection between said arms, and a recording pen suspended from said link connection.

4. In combination, a pair of electricity motor meters arranged in the same horizontal plane and adapted to be operated by electric currents conveyed thereto and each having its own independent shaft, a horizontal arm projecting from the shaft of each motor meter, a link connection between the ends of said arms, a hanger suspended from said link connection, and a recording pen carried by said hanger.

5. In combination, a pair of independently-operable motor elements adapted to be operated either separately or simultaneously and each having its own shaft, an arm projecting from the shaft of each motor element, a link connection between said arms, and a recording pen carried by said link connection.

6. In combination, a pair of independently-operable motor elements rotatable through a limited arc and adapted to be operated by electric currents conveyed thereto either separately or simultaneously and each having its own shaft, an arm projecting from the shaft of each motor element, a link connection between said arms, and a recording pen suspended from said link connection.

7. In combination, a pair of independently-operable electricity motor meters each having an element rotatable through a limited arc and adapted to be moved by a current conveyed thereto, said motor elements being adapted to be operated either separately of each other or simultaneously and arranged on the same horizontal plane, a shaft connected with the rotatable element of each of said motor meters, a horizontal arm projecting from each of said shafts, a link connection between the ends of said arms, a hanger suspended from said link connection, and a recording pen carried by said hanger.

8. A marking-pen for graphic recording instruments having a movable record-strip, consisting of an ink receptacle, a stylus adapted to take ink from said ink receptacle, and a roller bearing adapted to bear upon said record-strip and hold the point of said stylus out of frictional contact therewith.

9. A marking-pen for graphic recording instruments having a movable record-strip consisting of an ink receptacle, a stylus adapted to take ink from said ink receptacle, and a roller bearing carried near said stylus and adapted to bear upon the surface of said record-strip and hold the point of said stylus out of close contact therewith.

ROBERT C. LANPHIER.

Witnesses:
GRACE L. HOOPER,
CHAS. G. LANPHIER.